United States Patent [19]

Kim

[11] Patent Number: 5,113,294

[45] Date of Patent: May 12, 1992

[54] AUTOMATIC CONTROL METHOD FOR HOME APPLIANCES USING VIDEO TAPE RECORDER, AND DEVICE THEREOF

[75] Inventor: Kyung-su Kim, Seoul, Rep. of Korea

[73] Assignee: SamSung Electronics Co., Ltd., Suwon, Rep. of Korea

[21] Appl. No.: 396,104

[22] Filed: Aug. 21, 1989

[30] Foreign Application Priority Data

Dec. 31, 1988 [KR] Rep. of Korea .......... 88-18093

[51] Int. Cl.$^5$ .................................. H04N 5/782
[52] U.S. Cl. ........................................ 360/33.1
[58] Field of Search ............ 358/335, 194.1, 190;
360/33.1, 79; 364/145, 144, 143, 705.04, 705.07,
705.08; 340/825.15, 309.15, 825.19; 379/102,
104; 455/171, 181, 231, 344, 603; 369/70

[56] References Cited

U.S. PATENT DOCUMENTS

| | | | |
|---|---|---|---|
| 4,334,242 | 6/1982 | Mangold | 358/335 |
| 4,623,887 | 11/1986 | Willis, II | 358/335 |
| 4,625,080 | 11/1986 | Scott | 358/335 |
| 4,626,848 | 12/1986 | Ehlers | 455/603 |
| 4,903,130 | 2/1990 | Kitagawa et al. | 358/190 |
| 4,918,439 | 4/1990 | Wozniak et al. | 379/102 |
| 4,942,488 | 7/1990 | Osawa | 360/33.1 |
| 4,979,094 | 12/1990 | Gemmell et al. | 340/825.19 |

Primary Examiner—Donald McElheny, Jr.
Attorney, Agent, or Firm—Robert E. Bushnell

[57] ABSTRACT

An automatic control method for home appliances using a video tape recorder and a device thereof are disclosed, in which the device comprises one or more power source control means, a home automatization mode designation means, and a microcomputer; and the method comprises: a step of appointing power supply starting times and power supply ending times for the respective passively controlled apparatuses; a step of supplying the power source upon arrival of the power source supply time for a particular apparatus; and a step of disconnecting the power supply from a particular apparatus upon arrival of the power supply blocking time. According to the present invention, as many automatic controls of home appliances as the record-capable number of the programmed recordings of broadcasting programs are possible, and it is possible to use a part of the function for programmed recordings of broadcasting programs, and to use the remaining part of the function for automatic controls of home appliances.

4 Claims, 4 Drawing Sheets

AUTOMATIC CONTROL METHOD FOR HOME APPLIANCES USING VIDEO TAPE RECORDER, AND DEVICE THEREOF

FIELD OF THE INVENTION

The present invention relates to a home automatization technique, and particularly to an automatic control method for the power sources of home appliances using the programmed recording function of video tape recorder(to be called hereinafter "VTR").

BACKGROUND OF THE INVENTION

Recently, in accordance with the diversification and specialization of professions, qualified persons are required to a greater degree, as well as the increase of the requirement for overall professional man power, and in parallel to this phenomenon, the social participations of females are also increasing. Thus female labor force is being diverted from the house keeping to social activities, and accordingly, a home automatization for automatically handling the homes tasks came to be needed.

In accordance with such demand for home automatization, various kinds of home automatization techniques are being introduced. As the typical conventional home automatization devices, there are a system including a dedicated microcomputer, and a system including a personal computer. There is still another system in which a telephone line is incorporated so that the home task could be remote-controlled by means of a telephone.

Meanwhile, the system using a VTR came to be prevalent most recently in the home automatization field, and many of these systems are provided with a programmed recording function.

SUMMARY OF THE INVENTION

Therefore, it is an object of the present invention to provide an automatic control method for home appliances using VTR, in which the programmed recording function of VTR is utilized so that the user can activate various passively controlled apparatus, i.e., various home appliances at an appointed time.

It is another object of the present invention to provide a device for automatically controlling home appliances using VTR, which is most suitable for carrying out the above mentioned method.

In achieving the above objects, the method of the present invention, which uses a VTR capable of automatically recording the TV broadcasting programs corresponding to a plurality of program numbers for the programmed periods of time at the appointed times, comprises:

A step of appointing the starting time and ending time of the power supply to the passively controlled apparatus for the setting of the programmed recordings correspondingly with the program numbers and in accordance with the designation of the home automatization mode;

a step of supplying the power source to the passively controlled apparatus upon arrival of the power supply starting time for a particular passively controlled apparatus; and a step of disconnecting the power supply from the passively controlled apparatus upon arrival of the power supply blocking time for the particular passively controlled apparatus.

In achieving the above objects, the device of the present invention, which uses a VTR capable of programmed recordings, comprises:

at least one or more power source control means parallelly connected to an AC power source inlet line, and for supplying and blocking the AC power source to and from the passively controlled apparatus in accordance with control signals;

a home automatization mode designating means for designating the home automatization mode; and a microcomputer for memorizing the power supply starting time and the power blocking time for the passively controlled apparatus under a programmed recording mode correspondingly with the program numbers and in accordance with the designation of the home automatization mode, for outputting a control signal to the relevant power source control means for supplying the power to the passively controlled apparatus upon arrival of the power source supply starting time for the passively controlled apparatus, and for outputting a control signal to the relevant power source control means for blocking the power supply to the passively controlled apparatus upon arrival of the power supply blocking time for the passively controlled apparatus.

BRIEF DESCRIPTION OF THE DRAWINGS

The above objects and other advantages of the present invention will become more apparent by describing in detail the preferred embodiment of the present invention with reference to the attached drawings in which.

DESCRIPTION OF THE PREFERRED EMBODIMENT

Figure 1:
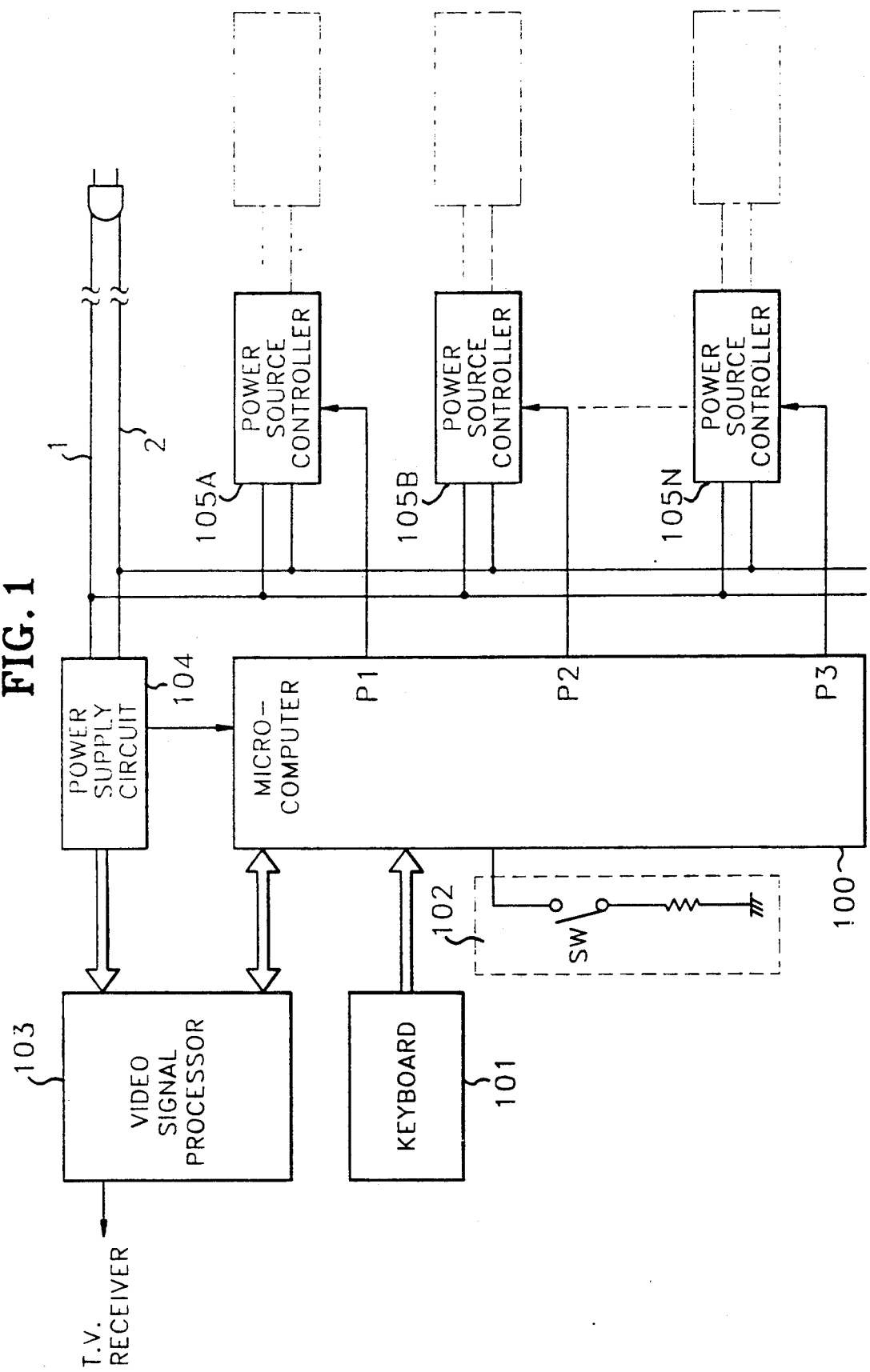
FIG. 1 illustrates the system according to the present invention.

FIG. 1 illustrates the system of the present invention, which comprises:

a microcomputer 100 for overall control of the system;

a keyboard 101 for converting the data inputted by the user to a digital key data, and for transmitting it to the microcomputer 100;

a home automatization mode designating means 102 such as a mode converting switch SW for designating a home automatization mode or programmed recording operations through the operation of the user;

a video signal processing means 103 for displaying on the television screen after regenerating the video program recorded on a tape under the control of the microcomputer 100;

a power supply means 104 for supplying the operation voltages to the video signal processing means 103 and to the system after adjusting the voltage of the external power source under the control of the microcomputer 100; and a plurality of power source control means 105A-105N for controlling the power source supplied to the corresponding home appliances under the control of the microcomputer 100.

Figure 2:
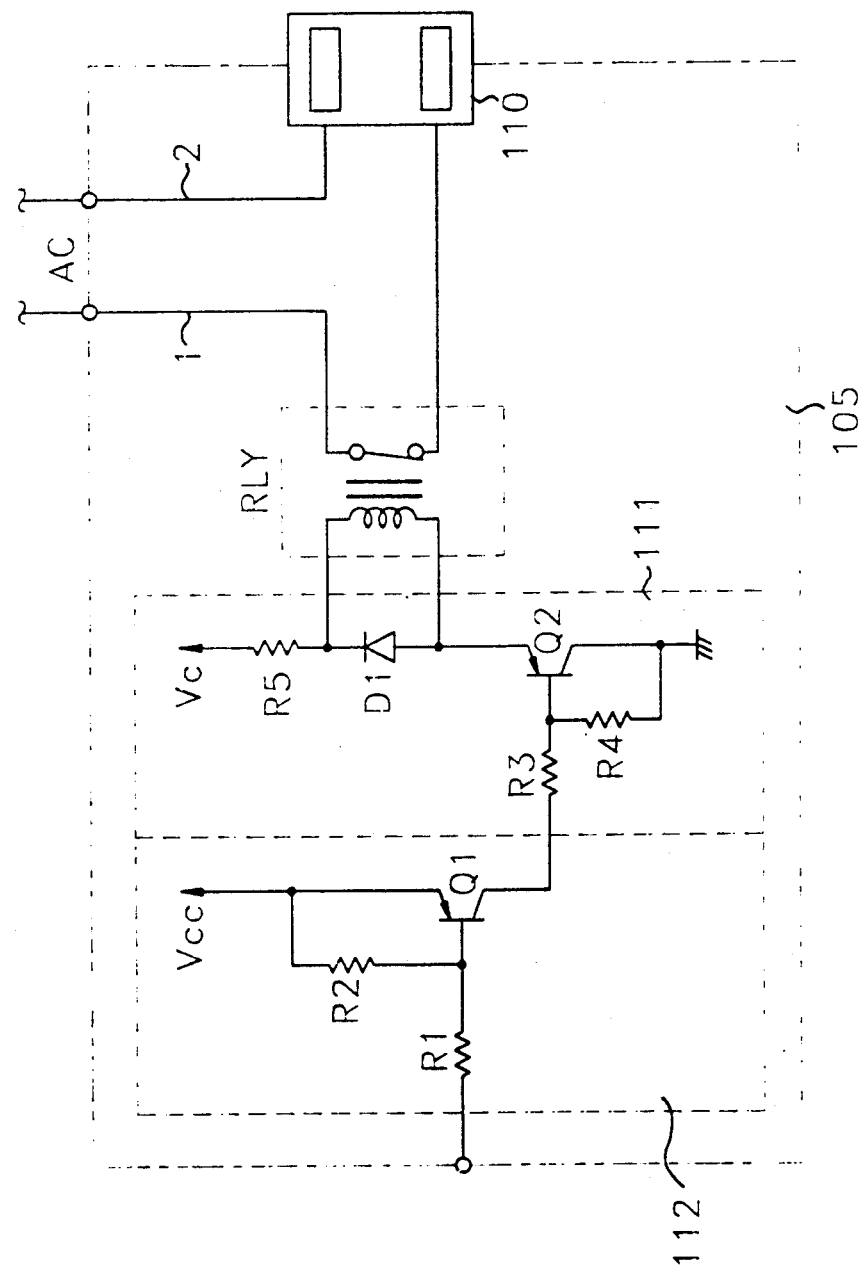
FIG. 2 is an exemplary circuital illustration of the power source control means of FIG. 1.

FIG. 2 is an exemplary circuital illustration of the power source control means of FIG. 1, in which one of the terminals of a connecting means 110 such as a receptacle provided in the passively controlled apparatus such as home appliances is connected to an input line 1 of the AC power source while the other terminal to an input line 2 of the A power source through a relay RLY. The coil section of the relay RLY is connected to a relay driving means 111 consisting of three resistances R3-R5, a diode D1 and a transistor Q2, so that the coil section should energized by a control signal outputted through output ports P1-PN of the microcomputer 100. The relay driving means 111 is connected to an amplifying means 112 consisting of two resistances R1, R2 and a transistor Q1 for amplifying the supplied control signal.

Figure 3A:
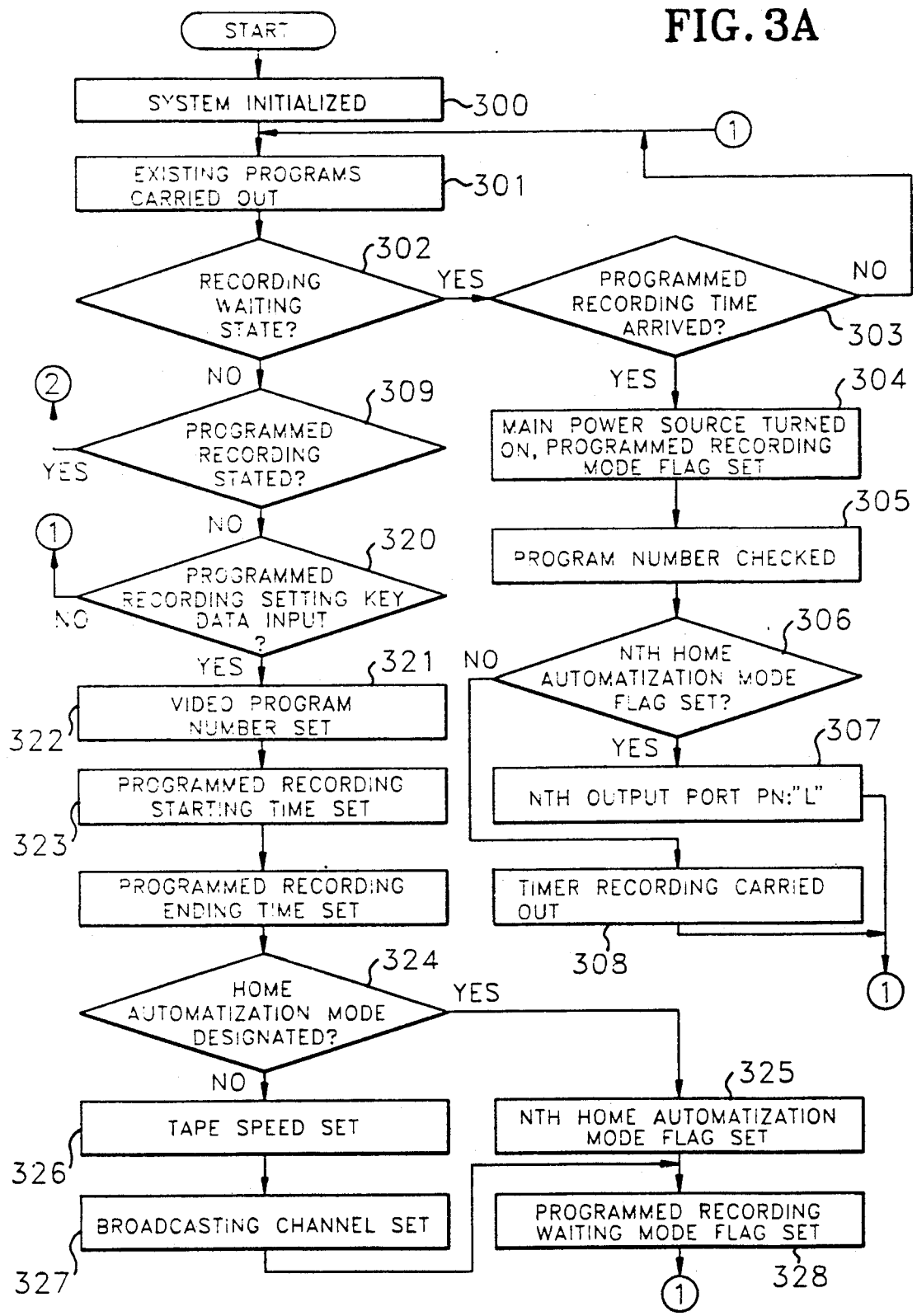
FIGS. 3A and 3B are flow charts of the system of the present invention.
Figure 3B:
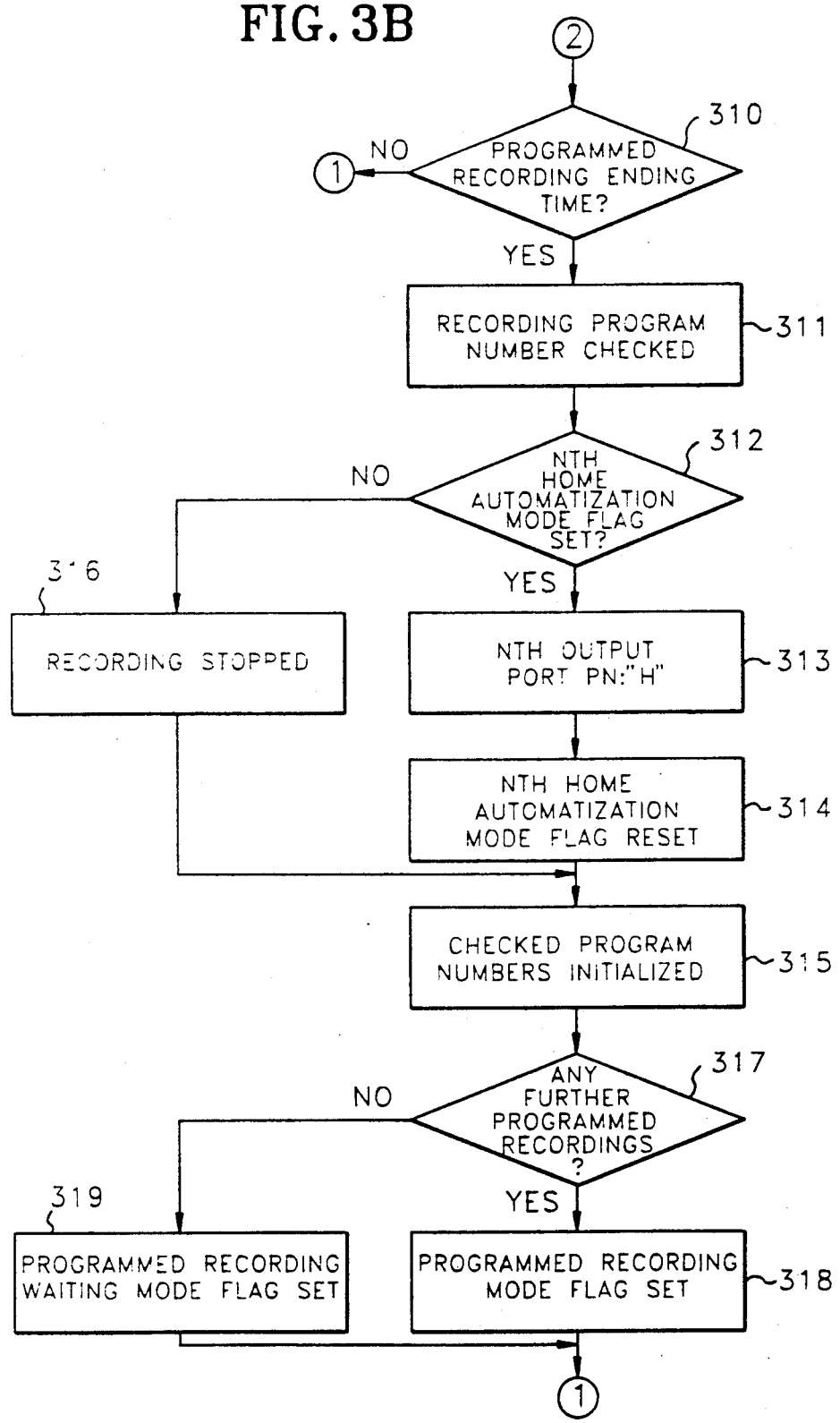

FIGS. 3A and 3B are flow charts of the present invention, in which, upon turning on the power source, the system is initialized, the existing main program is carried out, and then, a checking is made as to whether a recording is being waited for, or a programmed recording is being carried out.(First step).

If the system is neither in a state waiting for a recording nor is carrying out a programmed recording in the first step, a checking is made as to whether the system is receiving a request for setting a programmed recording. (Second step).

If the system is receiving a request for setting a programmed recording in the second step, then the video program number, the programmed recording starting time and the programmed recording ending time are sequentially set, and then, a checking is made as to whether the system is under the designation of a home automatization mode.(Third step).

If a home automatization mode is designated in the third step, then a home automatization mode is set, a programmed recording waiting mode is also set, and then, the function returns to the first step(Fourth step).

If a home automatization mode is not designated in the third step, then the tape speed and the broadcasting channel are set, and an appointment waiting mode is also set(Fifth step).

If a recording is being waited for in the first step, then a checking is made as to whether the programmed recording starting time has been arrived, and if the programmed recording starting time has been arrived, then the operating power is supplied into the system, and the broadcasting program number to be recorded is checked, while a checking is also made as to whether the system is under a home automatization mode(Sixth step).

If the system is under a home automatization mode in the sixth step, then the operating power is supplied in order to activate the home appliance corresponding to the broadcasting program checked as mentioned above, a programmed recording mode is set instead of a programmed recording waiting mode, and the function is returned to the first step(Seventh step).

If the system is not under a home automatization mode in the sixth step, a recording mode is activated to record the broadcasting program, a programmed recording mode is set instead of a programmed recording waiting mode, and the function is returned to the first step(Eighth step).

If the system is under a programmed recording in the first step, then a checking is made as to whether the programmed recording termination time has arrived, and, if it has arrived, then a checking is made as to the broadcasting program number currently being recorded, and a checking is also made to whether the system is under a home automatization mode(Ninth step).

If the system is under a home automatization mode in the nineth step, then the power source which has been supplied to the home appliance having a number corresponding to the broadcasting program checked as mentioned above is disconnected, and the home automatization mode and the broadcasting program number checked as above are initialized(Tenth step).

If the system is not under a home automatization mode in the nineth step, then the programmed recording is stopped, and the checked broadcasting program is initialized (Eleventh step).

After carrying-out the tenth or eleventh step, a checking is made as to whether there is any program for a programmed recording(Twelfth step).

If there is a further program for a programmed recording in the twelfth step, then a programmed recording waiting mode is set instead of a programmed recording mode, and the function is returned to the first step(Thirteenth step).

If there is no further program for a programmed recording in the twelfth step, the under-recording mode is cleared, and the function is returned to the first step(Fourteenth step).

Now the present invention will further be described referring to FIGS. 1 to 3B.

First, the circuits of FIGS. 1 and 2 will be described. The user will connect the home appliances such as fluorescent lamp, TV, audio disc player, electric rice pot and the like to the corresponding ones of the plurality of the power control means 105A-105N. If any one or some of the above home appliances are wanted to be operated for a certain period during the absence of the user (when the user will be out of the home), the user can set the power supply starting time and the power supply ending time through the key board 101 as in the same manner as the usual programmed recording operation of a VTR. Further, the user has to turn on the home automatization mode designating means 102 to set the appointments so that the programmed recording of the broadcasting program and the controls of other home appliances should be discriminately set.

The setting method will be described referring to FIGS. 3A and 3B later.

Thus, the power cord plugs of the home appliances which are to be automatically controlled have to be connected to the respective receptacles of the power source control means 105A-105N of FIG. 2, and then the power source switches of the home appliances have only to be turned on. If the appointed time arrives for a certain home appliance, then the power source control means will supply the operating power to the mentioned home appliance in response to a power source control signal of a low logic state outputted from the output port of the microcomputer 100.

For example, if the VTR is to record the broadcasting program corresponding to No.1, the output state of the first output port P1 of the microcomputer 100 will be shifted from a high logic state of the ordinary time to a low logic state. Therefore, under this condition, the first power source control means 105-A will be operated as shown in FIG. 2.

Then, the voltage is divided by the two resistances R1,R2 in FIG. 2, and the transistor Q1 is turned on. Therefore, the power source Vcc is divided by the two resistances R3, R4 to be supplied to the base of the transistor Q2. Upon turning-on of the transistor Q2, the relay RLY will also be turned on, and therefore, the power source will be supplied to the receptacle 110, so that the power source should be supplied to the home appliance, thereby making the home appliance operable.

Meanwhile, upon arrival of the programmed recording ending time, the output state of the first output port P1 of the microcomputer 100 will be shifted back to a high logic state, so that the relay RLY should be turned off, and that the operating power which has been supplied to the home appliance through the receptacle 110 is disconnected. The remaining power source control means 105B,105N are also operated based on the same principle, and supply or block the operating power to and from the home appliance through the receptacles in accordance with the control signals outputted from the output ports P2,PN of the microcomputer 100.

The diode D1 plays the role of a surge observer for inhibiting the occurrence of a surge during the driving of the relay RLY.

FIGS. 3A and 3B are a flow chart showing the operations of the microcomputer 100, and here, the block 300 for initializing the system and the block 301 for carrying out the main program will be excluded from detailed descriptions because they are known type of operations.

After carrying out the existing main routine at the block 301, a judgement is made as to whether the system is in a state waiting for a programmed recording at the block 302. If the result of the judgement is affirmative, then a judgement will be made as to whether the present time corresponds to the programmed starting time (Block 303). If it corresponds, then the blocks 304 to 308 will be carried out. At the blocks 304 to 308, a judgement is made as to whether the appointed program is a programmed recording of a broadcasting program or an automatic control of another kind of home appliance, so that a proper operation should be carried out in accordance with the result of the judgement. On the other hand, if the present time does not correspond to the appointed time, the main program will be repeatedly carried out. If the system is not under a programmed recording waiting mode, then a judgement will be made as to whether a programmed recording mode is being carried out(Block 309).

Then a judgement is made as to whether the present time corresponds to the programmed recording ending time(Block 310). If it does not, then the main program is carried out repeatedly, and if it does correspond, then the programmed recording ending procedures of blocks 31-319 are carried out. In the blocks 311-319, a checking is made as to what number the present program belongs to, that is, how many programs precedes the present one, and a checking is made as to whether a home automatization flag corresponding to the relevant number has been set. Then, a judgement is made as to whether the programs carried out up to then are the simple programmed recordings of the broadcasting programs, or are the automatic controls of the home appliances, and then, the relevant program is terminated. Here the Nth home automatization flag means the value obtained by checking as to what number the broadcasting program belongs to in the order of the programmed recording setting.

Meanwhile, if the system is not under a programmed recording mode, then a checking is made as to whether it is a key input data for a programmed recording (Block 320). If it is not a key input data, then the main program is continuously carried out, whereas, if a programmed recording key input data is inputted, then a blocks 321 to 328 is carried out.

Blocks 321-328 are for setting programmed recordings of broadcast programs and automatic controls of home appliances. That is, what number the programmed recording of the broadcasting program belongs to is decided, and the appointed time and the ending time are set. Then, at the same time, a checking is made about the logic state of the home automatization mode selecting signal transmitted from the home automatization mode designating means 102, and then, settings are made after making a classification into simple programmed recordings of the broadcasting programs and programmed automatic controls of the home appliances. If there are only simply programmed recordings of broadcasting programs, then the tape speed and the broadcasting channel are set.

As described above, according to the present invention, as many automatic controls of home appliances as the record-capable number of the programmed recordings of broadcasting programs are possible, and, if any of the automatic controls of the home appliances is not desired, then the function corresponding to it can be turned to programmed recordings of broadcasting programs. That is, it is possible to use a part of the function for programmed recordings of the broadcasting programs, and to use the remaining part of the function for automatic controls of home appliances.

What is claimed is:

1. An automatic control method for home appliances using a video tape recorder in which television broadcasting programs can be automatically recorded according to a plurality of program numbers at the respective appointed times and for the respective scheduled periods of time, comprising:

a step of appointing power supply starting times and power supply ending times for the home appliances based on the designation of a home automatization mode for the respective program numbers in a setting procedure of programmed recordings;

a step of supplying power from a power source upon arrival of the power supply starting time for a particular home appliance; and a step of disconnecting the power source upon arrival of the power supply ending time for said particular home appliance.

2. An automatic control device for home appliances using a video tape recorder in which television broadcasting programs can be automatically recorded according to a plurality of program numbers at the respective appointed times and for the respective scheduled period of time, comprising:

at least one or more power source control means connected to an AC power source line, and for supplying and blocking the AC power source to and from the home appliances in accordance with control signals supplied;

a home automatization mode designation means for designating a home automatization mode; and a microcomputer for memorizing power supply time and the power blocking time for the home appliances under a programmed recording mode correspondingly with the program numbers and in accordance with the designation of the home automatization mode by said home automation mode designation means, for outputting a control signal to the relevant power source control means for supplying power to one of the home appliances upon arrival of the power supply time for said one of the home appliances, and for outputting a control signal to the relevant power source control means for blocking the power supply to said one of the home appliances upon arrival of the power supply blocking time for said one of the home appliances,
wherein in home automatization functions can be carried out by appointing respective AC power source supply times for at least one or more of said home appliances.

3. The automatic control device for home appliances as claimed in claim 2, wherein said power source control means comprises:
a home appliance connecting means connected in parallel to the input line of an AC power source; and
a switching means connected between said AC power source input line and said home appliance connecting means, for turning on or off the connection between said home appliance connecting means and said AC power source input line in accordance with said control signal.

4. The automatic control device home appliances as claimed in claim 3, wherein said switching means comprises:
a relay;
a relay driving means for driving said relay; and
an amplifier for amplifying said control signals from said microcomputer, and for supplying them to said relay driving means.

* * * * *